June 22, 1965  A. S. VOLPIN  3,190,303
AUTOMATIC PLASTIC SEALED GATE VALVE
Filed Dec. 24, 1962  4 Sheets-Sheet 1

Alexander S. Volpin
INVENTOR.

BY

ATTORNEY

June 22, 1965     A. S. VOLPIN     3,190,303
AUTOMATIC PLASTIC SEALED GATE VALVE
Filed Dec. 24, 1962     4 Sheets-Sheet 2
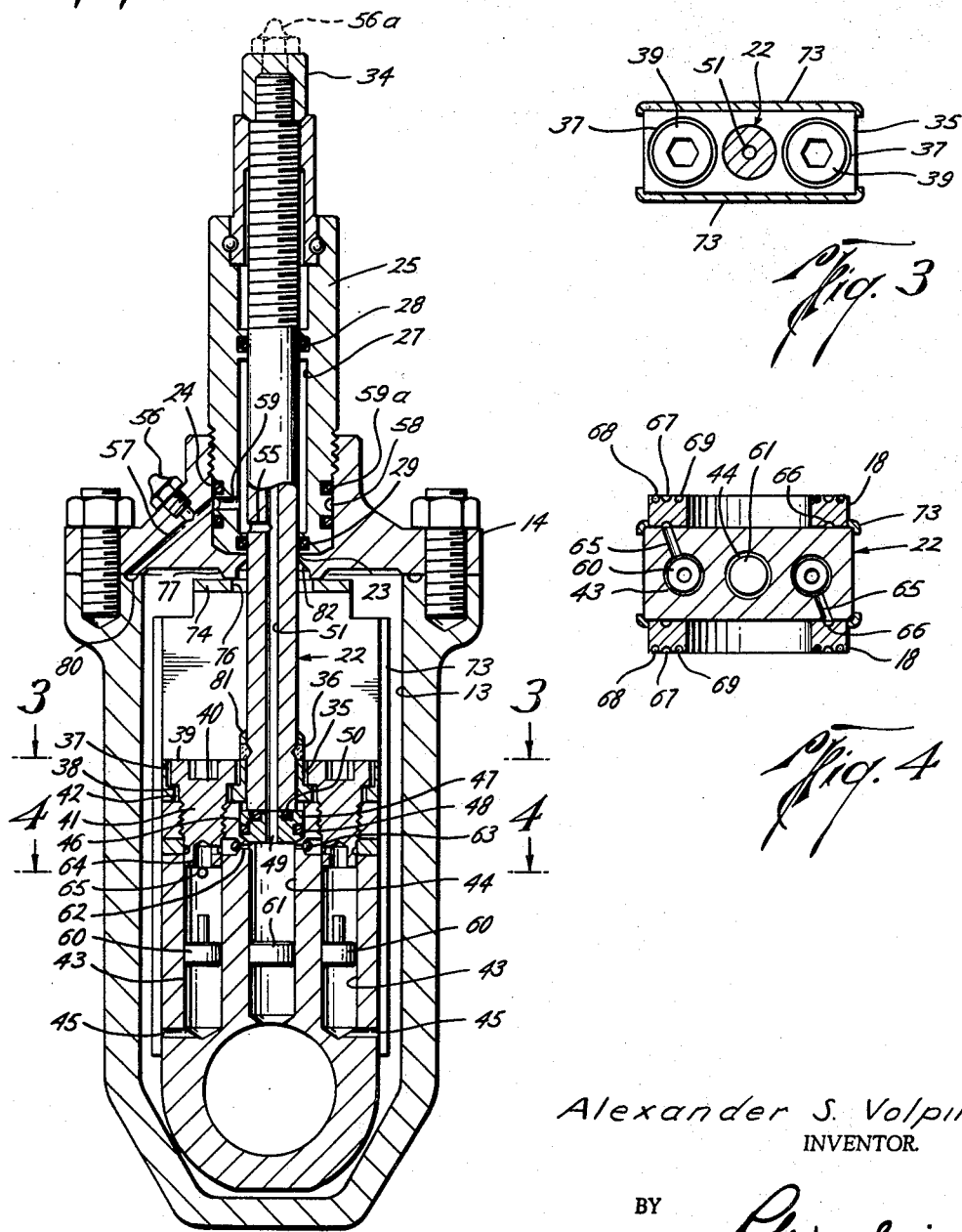
Alexander S. Volpin
INVENTOR.
BY
ATTORNEY

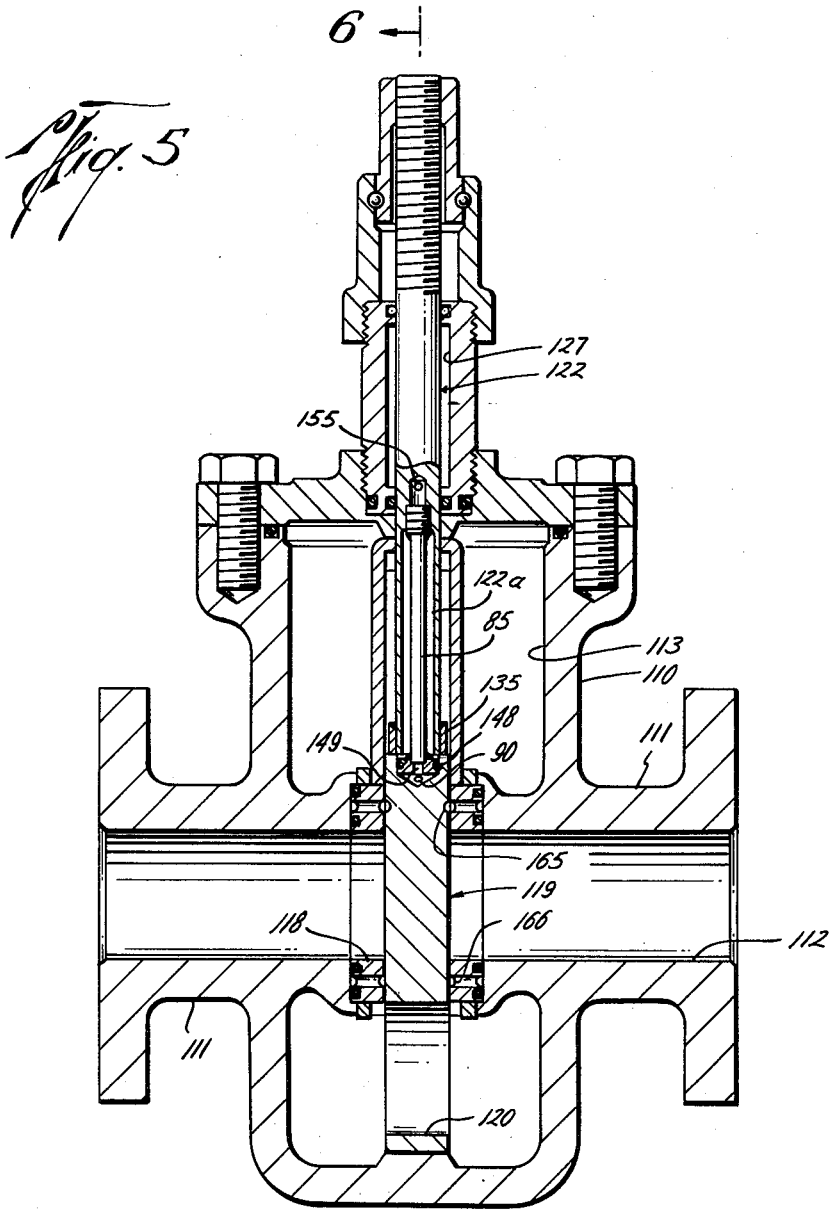

June 22, 1965  A. S. VOLPIN  3,190,303
AUTOMATIC PLASTIC SEALED GATE VALVE
Filed Dec. 24, 1962  4 Sheets-Sheet 4
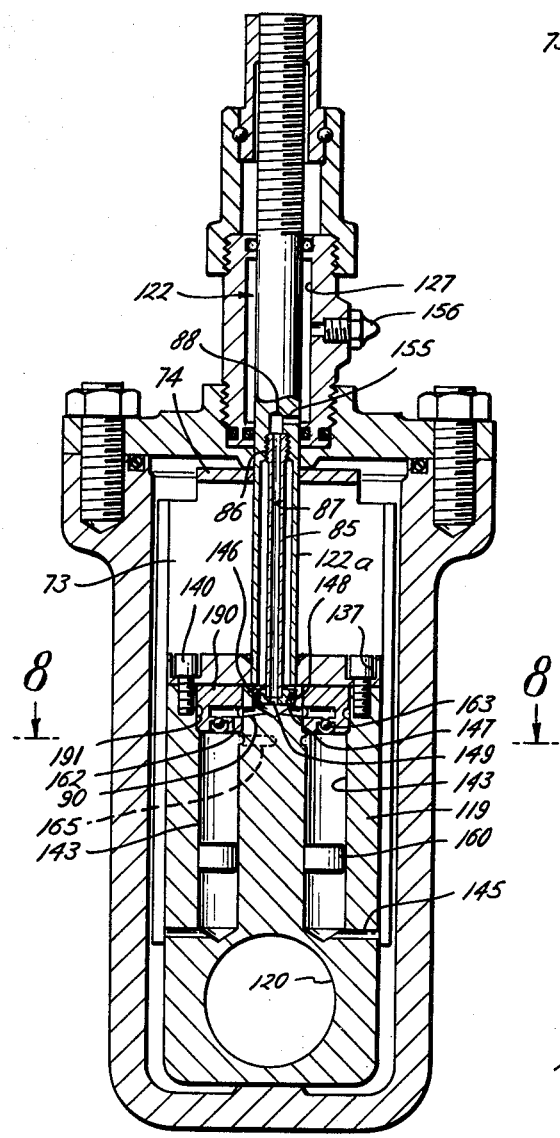
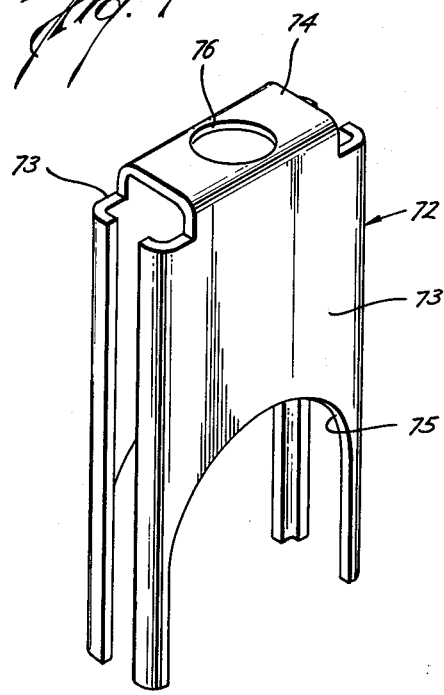
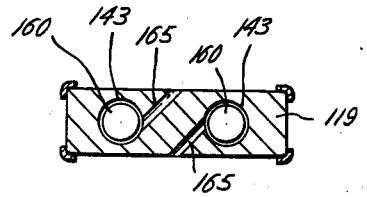
Alexander S. Volpin
INVENTOR.
BY
ATTORNEY United States Patent Office 3,190,303
Patented June 22, 1965

3,190,303
AUTOMATIC PLASTIC SEALED GATE VALVE
Alexander S. Volpin, 10200 W. Broadview Drive,
Miami Beach, Fla.
Filed Dec. 24, 1962, Ser. No. 246,754
15 Claims. (Cl. 137—246.12)

This invention relates to gate valves and more particularly to gate valves of the automatic sealed-type employing a plastic sealant or lubricant for effecting the seal.

In valves of the general class described, sealant reservoirs are provided, usually in the valve body, for delivering sealant to each side of the valve through suitable conduits, channels and grooves provided in the valve body, the gate seats and the gate. In relatively small size valves, the provision of these sealing structures and the necessary drilling, boring and machining required, do not present any particular fabricating problems, since the sizes of the bodies are not very large or heavy and can be readily handled. However, where automatic sealed valves are designed for use in large diameter oil and gas pipe lines, for example, where pipe sizes may run up to 30 to 36 inches, the body castings become enormous in size and weight, and handling for purposes of drilling and other machining operations becomes most difficult and expensive.

Accordingly, it is a primary object of this invention to provide a gate valve construction adapted particularly for large size gate valves of the through-conduit type commonly employed for use in large diameter oil and gas pipe lines, and which has features of construction which obviate the need for much of the machining and other handling operations of the large bodies heretofore required for automatic sealing valves of this character.

An important object of this invention is to provide a valve construction in which the sealant reservoirs are located in the valve gate and sealant is supplied thereto through the valve stem and thence through channels in the gate member to the sealing grooves.

A further object in accordance with this invention is to provide a gate construction for valves of the general class described in which the gate is laterally movable relative to the stem under line pressure while sealing is maintained between the stem and the sealant reservoirs in the gate, in order to maintain the required pressure differential on the reservoirs.

In gate valves, particularly of the large sizes referred to, the sealing grooves are necessarily of such dimensions as to require substantial volumes of sealant to fill them each time the gate is closed. The loss of sealant which may occur during repeated opening and closing of the gate may deplete the reservoir supply and result in an ineffective seal and consequent leakage through the valve.

It is a further object of this invention, therefore, to provide in the valve gate an auxiliary sealant reservoir of relatively large capacity adapted to automatically supplement the supply of sealant available from the individual primary supply reservoirs.

Other and more specific objects and advantages of this invention will become more readily apparent from the following detailed description when read in conjunction with the accompanying drawing which illustrates two useful embodiments in accordance with this invention.

In the drawing:

FIG. 2 is a vertical transverse section taken along line 2—2 of FIG. 1;

Figure 1:
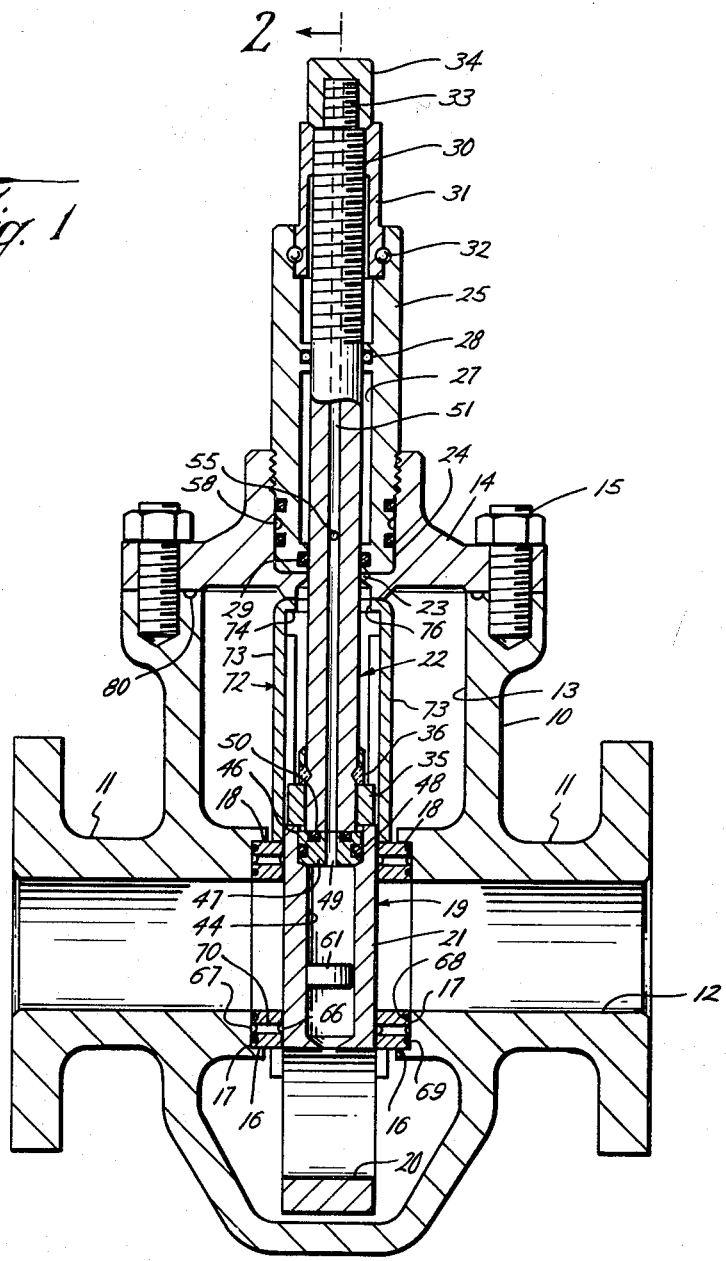
FIG. 1 is a longitudinal vertical cross-section of a gate valve in accordance with one embodiment of this invention.

FIGS. 3 and 4 are cross-sectional views of the gate taken generally along lines 3—3 and 4—4, respectively, of FIG. 2;

FIG. 5 is a longitudinal vertical section of another embodiment in accordance with this invention;

FIG. 6 is a vertical transverse cross-section taken along line 6—6 of FIG. 6;

FIG. 7 is a perspective view of a gate shroud employed in both embodiments; and

FIG. 8 is a cross-sectional view taken along line 8—8 of FIG. 6.

Referring first to the embodiment illustrated in FIG. 1, the valve, which is of the through-conduit, rising stem gate type, comprises a valve housing or body 10 having opposed flow ports 11—11 forming the flowway 12 which is intersected interiorly of the housing by the gate chamber 13. The upper end of chamber 13 is closed by means of a bonnet 14 which is removably secured to the upper end of housing 10 by means of the studs 15. The inner ends of flow ports 11 have annular recesses 16 defined by the bottom walls 17 surrounding the flowway. Annular gate seats 18 are removably seated in recesses 16.

A gate, designated generally by the numeral 19, is disposed in chamber 13 for vertical reciprocation across flowway 12 between gate seats 18—18. Gate 19 is of one-piece, generally rectangular, flat-sided construction, the side faces being slidably engageable with the inner end faces of seats 18—18. The gate is provided near its lower end with a transverse opening 20 adapted to register with flowway 12 when the gate is in the raised or open position. The upper portion of the gate forms the closure section 21 which is adapted to cut off flow through flowway 12 when the gate is in the lower or closed position, as seen in FIG. 1.

Gate 19 is reciprocated by means of a generally cylindrical stem, designated generally by the numeral 22. The lower end of stem 22 is operably secured to gate 19 by means to be subsequently described and extends upwardly through an opening 23 and a communicating enlarged socket 24 in bonnet 14. A bonnet sleeve 25 is threadedly received in socket 24 surrounding stem 19, and has an enlarged bore providing an annular chamber 27 surrounding the stem. Upper and lower longitudinally spaced packings, such as O-ring seals 28 and 29, respectively, are seated in the wall of sleeve 25 to form closures at opposite ends of chamber 27 about the stem through which the latter is slidable. The upper portion of stem 22 is provided with a section of external threads 30 which are received in an internally threaded drive nut 31 which is rotatably mounted in the upper end of sleeve 25 in antifriction bearings 32. It will be understood that drive nut 31 is adapted to be connected to a conventional mechanical or manual operator (not shown) by means of which rotation may be imparted to the drive nut for raising and lowering stem 22 and gate 19. The upper end of stem 22 terminates in a threaded pin 33 on which is mounted a cap 34.

The connection between stem 22 and gate 19 includes a transverse yoke 35 comprising a generally rectangular plate conforming in configuration to the upper end of gate 19. Yoke 35 is rigidly secured to stem 22 by suitable means such as welding 36. The yoke is provided on opposite sides of stem 22 with vertical openings 37 having larger and smaller diameter portions defining a step or shoulder 38 therein to engage the heads 39 of studs 40. The shanks 41 of the latter extend through the openings and have thread sections 42 which are threadedly received in the upper ends of vertical cylindrical chambers 43—43 provided in the body of gate 19 and forming the primary sealant reservoirs for the opposite sides of the valve, as will appear subsequently. The diameters of the stepped portions of openings 37 are larger than those of heads 39 and shanks 41 which are accommodated therein, providing a small amount of annular clearance which will permit a corresponding amount of lateral movement of gate 19 relative to stem 22. A third vertical cylindrical chamber 44 is provided in the body of gate 19 centrally between chambers 43—43 and is preferably somewhat larger in diameter than chambers 43. The lower end of chamber 44 is in open communication with transverse opening 20 in the gate, while the lower ends of chambers 43—43 are in communication with gate chamber 13 through lateral passages 45—45.

The upper end of chamber 44 is enlarged to form the socket 46 into the upper end of which the lower end of stem 22 extends. A filler or seal ring 47 is seated in socket 46 and has an annular packing, such as an O-ring 48, mounted in its periphery to seal with the wall of socket 46. A central passage 49 extends through ring 47 into communication with the interior of chamber 44. The upper end of ring 47 is in slidable abutment with the lower end face of stem 22 and an annular seal packing 50 is mounted in the upper end face of ring 47 surrounding passage 49 and sealing between ring 47 and the lower end face of stem 22. The latter is provided with a central bore 51 extending longitudinally thereof throughout its length and registering at its lower end with passage 49 inside the confines of packing 50. The upper end of bore 51 will be closed by means of a cap 34.

Bore 51 forms the primary channel by which sealant is supplied to the several reservoirs and other portions of the valve. As shown in full lines in FIG. 2, sealant is supplied to bore 51 by a series of interconnecting passages which include a passage 55 which extends laterally through stem 22 between bore 51 and chamber 27, communicating with the latter at a point above packing 29. A sealant supply fitting 56, of conventional form, is mounted in the wall of bonnet 14 and communicates with a passage 57, one end of which leads into socket 24 where it communicates with an annular groove 58 formed in the exterior of bonnet sleeve 25. The latter is connected by means of a passage 59 with the interior of chamber 27. Annular seal packings, such as O-rings 59a, are disposed about the exterior of sleeve 25 at points above and below groove 58 to seal the latter off against the loss of sealant between the guide sleeve and the wall of socket 24. Alternatively, sealant may be supplied through a fitting 56a, shown in broken lines in FIG. 2, connected into the top of cap 34 and thence into communication with bore 51.

Each of the reservoirs 43 has a slidable barrier 60 therein, and central reservoir 44 has a barrier 61 slidable therein. Lateral passages 62 provide communication between the upper end of central reservoir 44 with the upper ends of each of the reservoirs 43. Check valves 63 are mounted in passages 62 to prevent reverse flow into reservoir 44 while permitting outward flow from the central reservoir toward reservoirs 43. Passages 62 communicate with passageways 64 provided in the lower ends of stud shanks 41 and opening into the respective reservoirs. Each of the reservoirs 43 is provided, near its upper end, with a lateral passage 65 opening to one side face of the gate; that is, the passage 65 from one reservoir will open to one side face of the gate, while the passage 65 from the other reservoir opens to the opposite side face, as best seen in FIG. 4. The outer ends of passages 65 are located so as to be in registration with and to communicate with annular sealant grooves 66 formed in the end faces of seats 18 which are contiguous to the side faces of gate 22 when the gate is in the lower or flowway-closing position. Similar annular grooves 67 are provided in the opposite end faces of the seats adjacent the bottom walls 17 of the seat recesses. Seal rings, such as O-rings 68 and 69, are seated in the rear end faces of seats 18 concentrically on opposite sides of grooves 67 to seal with bottom wall 17 of the seat recesses. Transverse passages 70 extend through the bodies of the seats to provide communication between grooves 66 and 67.

Gate 22 is enclosed by a guide shroud, designated generally by the numeral 72 and shown in perspective in FIG. 7. This guide shroud comprises a pair of side plates 73—73 connected at their upper end by an arbor 74. The shroud is dimensioned so that the side plates 73—73 will lie closely against the side face of the gate. The lower portions of side plates 73 are cut out to form arcuate recesses 75 which are adapted to fit closely about the upper portions of the seat rings and to extend slightly below the seats, as best seen in FIG. 1. Arbor 74 bears against an annular downwardly projecting boss 77 surrounding bonnet opening 23 and has an opening 76 through which stem 22 is movable. The longitudinal side edges of side plates 73 are bent toward each other to enclose the corners of the gate to thereby effectively guide the gate in its vertical reciprocation. A close sliding engagement is effected between the side faces of the gate and side plates 73 to permit the latter to act as wipers to clean the side faces of the gate when it is moved between opened and closed positions to protect the sealing faces of the gate and to automatically shut off the flow of sealant when the gate leaves the closed position.

The upper end face of housing 10 may be provided with an annular groove 80 communicating with the lower end of bonnet passage 57 whereby sealant being injected through any of the communicating passages will enter groove 80 and provide a plastic seal between the bonnet and the housing. It will be understood that a more conventional gasket may be used to effect this seal with or without the plastic seal, if desired.

Sealant will be supplied through either fitting 56 or 56a. In either case, the sealant will be transferred through bore 51 and passage 49 into reservoir 44, forcing barrier 61 to the bottom of the reservoir. When the latter is filled, sealant will flow through both sets of passages 62 and 64 into both reservoirs 43, forcing the barriers in the latter to the bottoms of the respective reservoirs as the latter are filled. Sealant will, of course, also enter chamber 27 and fill the latter as well as groove 80, where the latter has been provided.

In operation, the reservoir system is filled with sealant and when the gate is moved to the closed position, shown in FIG. 1, the line pressure differential acting on the upstream side of the gate, in this case indicated by the arrow in FIG. 1 to be the right-hand side, will urge the gate toward the downstream seat. The clearance provided through the connection formed by yoke 35 and studs 40 and the sliding engagement of ring 47 with the lower end of stem 22 will permit a small degree of lateral movement of the gate relative to the stem and toward the downstream seat, providing clearance on the upstream side of the gate for admitting upstream pressure into the gate chamber. The seals 48 and 50 will exclude this pressure from the interior of the central reservoir, as well as from the seat reservoirs, above the respective barriers. However, this line pressure in the gate chamber will be admitted through passage 45 of the downstream reservoir into the interior of the reservoir and will be exerted against barrier 60, urging the latter upwardly and thereby forcing sealant through passage 65 into groove 66 of the downstream seat, thereby effecting a plastic seal between the side face of the gate and the downstream seat. Some of the sealant will move through passages 70 from groove 66 into groove 67 and effect an additional plastic seal between the back face of the seat and the bottom wall 17 of the seat recess.

At the same time, the line pressure will be admitted through gate opening 20 into the lower end of central reservoir 44 and against barrier 61, urging the latter upwardly by reason of the pressure differential and the upward movement of barrier 61 will be available to force additional sealant through passages 62 and 63 into the downstream reservoir 43, and thence through passage 65 into the seat grooves, should there be insufficient sealant in the individual seat reservoir 43 to fill the related seat groove. In this way, an auxiliary supply of sealant is always available to supplement the supply provided in the individual seat supply reservoir. When the gate is moved upwardly to the open position, the initial upward movement will move passages 65 out of registration with seat grooves 66 and behind the contiguous plate 73 of the gate shroud, and thereby cut off the flow of sealant and its consequent loss during the opening movement of the gate.

By placing the sealant reservoirs and the supply passages in the gate, stem and bonnet elements of the valve, the need for machining and consequent handling of the massive valve body or housing of large valves is minimized. Moreover, chamber 27 and seals 28 and 29 form a stuffing box for the stem which also will be automatically filled with sealant and thus form a plastic seal for the stem which supplements seals 28 and 29. Further, the pressure differential acting on barrier 61 in central reservoir 44 will act to keep stuffing box chamber 27 and housing groove 80 supplied with sealant.

Alternatively, stem passage 55 may be eliminated and sealant supplied through fitting 56a for filling the several reservoirs. Additional sealant could be supplied through fitting 56 for filling stuffing box chamber 27 and housing groove 80. It is obvious, also, that groove 58 and passage 59 may be eliminated if a plastic seal between the bonnet and bonnet sleeve is deemed unnecessary.

Stem 22 may carry a tapered back-seal shoulder 81 which is located to lodge in a tapered seat 82 formed in the lower end of bonnet opening 23 when the gate has been moved to the upper fully opened position, thus providing an additional metal-to-metal seal between the stem and the bonnet to further supplement the plastic and O-ring seals previously described.

FIGS. 5 to 8 illustrate a somewhat modified construction which employs the same principles of construction for supplying sealant through the stem structure into the reservoirs provided in the gate element from which the seat grooves are then supplied. In this embodiment, the valve comprises the housing 110 having the flow ports 111 defining the flow passage 112, the inner ends of which receive the annular seats 118 which are slidably engaged by the opposite side faces of a rectangular one-piece gate, designated generally by the numeral 119, and having the through-conduit opening 120 at its lower end. The gate is reciprocated by means of a stem 122 which is secured to the gate by means of a yoke plate 135, which is welded or otherwise rigidly secured to stem 122 and is connected to the upper end of the gate by means of studs 140 passing through sockets 137 providing a small degree of clearance about the studs to permit a slight amount of lateral movement of the gate relative to the stem, as in the previously described embodiment. In the instant embodiment, the gate is provided with two reservoirs 143—143 whose lower ends communicate with the gate chamber 113 through passages 145.

The stem construction is modified from that previously described by providing a counterbore 122a extending from the lower end of the stem to an intermediate point therein. A tube 85 of substantially smaller diameter than counterbore 122a is disposed coaxially in the counterbore and is screwed into a threaded opening 86 provided in the body of the stem. Tube 85 has its bore 87 open to the lower end and communicating at its upper end with a passage 88, which is in communication with the lateral passage 155. The latter communicates with the stuffing box chamber 127 which is provided with a pressure fitting 156 by means of which sealant may be introduced into stuffing box chamber 127 and thence by way of passages 155 and 88 into bore 87 of tube 85. The latter projects below the lower end of yoke 137 and has secured to its lower end an anular head 147 which is received in a socket 146 provided centrally within the upper end of gate 119. A small amount of clearance will be provided between the upper end of head 147 and the lower end of stem 122. An annular seal 148 mounted in head 147 seals between the latter and the wall of socket 146. Head 148 has an axial passage 149 which registers with bore 87 and communicates with the bottom portion of socket 146. The upper ends of reservoirs 143 are closed by means of cylindrical plugs 190 having annular grooves 191 in the peripheries thereof. Lateral passages 90 provide communication between the bottom of socket 146 and the adjacent grooves 191. The latter are connected by passages 162 with the interiors of reservoirs 143 and are controlled by check valves 163 which prevent reverse flow of fluid from the reservoirs into the passages. A passage 165 leads through the body of gate 119 from the upper end of each of the reservoirs 143 to the opposite sides of gate 119 (FIG. 8). These passages 165 are positioned to communicate with grooves 166 in the seats 118 when the gate is in the down or closed position.

In operation, differential pressure from the upstream side of the gate will act through passage 145 against the barrier 160 in the downstream reservoir to move the sealant from the downstream reservoir 143 via passages 162 and 165 into the seat groove 166, thereby providing the desired plastic seal when the gate is in the closed position.

The connection provided between the gate and tube 85, which is relatively flexible, permits the necessary lateral movement of the gate under the differential pressure to provide the clearance for admission of line pressure into the gate chamber. At the same time, the seal 148 prevents the line pressure from getting into the upper portions of the reservoirs.

It will be understood that an auxiliary reservoir, like reservoir 44 of the previously described embodiment, may also be incorporated in gate 119 of the present embodiment to provide the auxiliary supply of sealant, if desired. It will be seen that in all other respects the embodiment of FIGS. 5 to 8 is substantially the same as the first described embodiment and provides a construction which obviates the need for machining and handling of the massive valve housing.

It will be understood that while two identical reservoir and sealing groove systems are illustrated in both embodiments for supplying both sides of the valve, only one, the downstream system, will be in use at any time. The symmetrical dual arrangement is provided so that either end of the valve may be the downstream end. However, if desired, only one sealant-supply system for one side of the valve may be employed, it being necessary, in such case, to make sure that the valve is properly connected in the pipe line to place the reservoir and its passage system at the downstream side of the valve. Also in such construction, an auxiliary or back-up reservoir for the single reservoir may be included.

It will be understood that various alterations and modifications may be made in the details of the illustrative embodiments within the scope of the appended claims but without departing from the spirit of this invention.

What I claim and desire to secure by Letters Patent is:

1. In a rising stem gate valve employing automatic plastic sealing, a gate and stem construction comprising, a one-piece, generally rectangular, flat-sided gate member having a transverse through-conduit opening in the lower end thereof, a sealant reservoir enclosed in the body of the gate member, a barrier slidably disposed in the reservoir, a port providing communication between the exterior of the gate member and the reservoir below the barrier, a passage communicating with the reservoir above the barrier and opening to one of the side faces of the gate member, a stem for reciprocating the gate member, means securing the stem to the gate member arranged to permit limited relative lateral movement between the stem and the gate member, seal means comprising a ring member carrying annular packing elements thereon slidably disposed between the stem and the gate member to maintain a seal therebetween, and sealant supply passage means extending through the stem and said seal means into communication with said reservoir above said barrier.

2. In a rising stem gate valve employing automatic plastic sealing, a gate and stem construction, comprising, a one-piece, generally rectangular, flat-sided gate member having a transverse through-conduit opening in the lower end thereof, a pair of spaced apart, longitudinally extending sealant reservoirs enclosed in the body of the gate member, barriers slidably disposed in the reservoirs, ports providing a communication between the exterior of the gate member and the reservoirs below the barriers, passages communicating the reservoirs above the barriers to the opposite side faces of the gate member, a stem for reciprocating the gate member, means securing the stem to the gate member arranged to permit limited relative lateral movement between the stem and the gate member, seal means disposed between the stem and the gate member to maintain a seal therebetween, and sealant supply passage means extending through the stem and said seal means into communication with said reservoirs above said barriers.

3. In a rising stem gate valve employing automatic plastic sealing, a gate and stem construction, comprising, a one-piece, generally rectangular, flat-sided gate member having a transverse through-conduit opening in the lower end thereof, a first sealant reservoir having a slidable barrier therein enclosed in the body of the gate member, a port providing communication between the exterior of the gate member and the reservoir below the barrier, a passage communicating the reservoir above the barrier to one of the side faces of the gate member, a second sealant reservoir having a slidable barrier therein enclosed in the body of the gate member and having communication below the barrier with the exterior of the gate member, a passageway in the gate member providing communication between said first and second reservoirs above the respective barriers, a stem for reciprocating the gate member, means securing the stem to the gate member arranged to permit limited relative lateral movement between the stem and the gate member, seal means disposed between the stem and the gate member to maintain a seal therebetween, and sealant supply passage means extending through the stem and said seal means into communication with said second reservoir above said barrier therein.

4. In a rising stem gate valve employing automatic plastic sealing, a gate and stem construction, comprising, a one-piece, generally rectangular, flat-sided gate member having a transverse through-conduit opening in the lower end thereof, a pair of spaced apart, longitudinally extending sealant reservoirs having slidable barriers therein enclosed in the body of the gate member, ports providing communication between the exterior of the gate member and the reservoirs below the barriers, passages communicating the reservoirs above the barriers to the opposite faces of the gate member, a third sealant reservoir having a slidable barrier therein enclosed in the body of the gate member and having communication below the barrier with the exterior of said gate member, passage means in the gate member communicating said third reservoir with each of said pair of reservoirs above the respective barriers, check valve means in said passage means opening outwardly from said third reservoir, a stem for reciprocating the gate member, means securing the stem to the gate member arranged to permit limited relative lateral movement between the stem and the gate member, seal means disposed between the stem and the gate member to maintain a seal therebetween, and sealant supply passage means extending through the stem and said seal means into communication with said third reservoir above said barrier therein.

5. In a rising stem gate valve employing automatic plastic sealing, a housing having a gate chamber therein, a bonnet closing said gate chamber, a flowway intersecting the gate chamber and provided with opposed gate seats, said seats having annular sealing grooves in the inner end faces thereof surrounding said flowway, a gate member reciprocable in said gate chamber across said flowway in slidable engagement with said seats, said gate member comprising a one-piece, generally rectangular, flat-sided body having a through-conduit opening in the lower end thereof, a sealant reservoir having a slidable barrier therein enclosed within said body, a port in the gate member providing communication between the gate chamber and the reservoir below said barrier, a passage in the gate member communicating the reservoir above the barrier with the exterior of the gate member at a point located to register with the sealing groove in the contiguous gate seat when the gate member is in the flowway-closing position, a stem for reciprocating the gate member, means securing the stem to the gate member arranged to permit limited lateral movement between the stem and the gate member, seal means comprising a ring member carrying annular packing elements thereon slidably disposed between the stem and the gate member to maintain a seal therebetween, and sealant supply passage means extending through the stem and said seal means into communication with said reservoir above said barrier.

6. In a rising stem gate valve employing automatic plastic sealing, a housing having a gate chamber therein, a bonnet closing said gate chamber, a flowway intersecting the gate chamber and provided with opposed gate seats, said seats having annular sealing grooves in the inner end faces thereof surrounding said flowway, a gate member reciprocable in said gate chamber across said flowway in slidable engagement with said seats, said gate member comprising a one-piece, generally rectangular, flat-sided body having a through-conduit opening in the lower end thereof, a pair of spaced apart, longitudinally extending sealant reservoirs enclosed within said body, barriers slidably disposed in the reservoirs, ports in the gate member providing communication between the gate chamber and the reservoirs below said barriers, passages in the gate member communicating the reservoirs above the barriers with the opposite faces of the gate member at points located to register with the sealing grooves in the respective contiguous gate seats when the gate member is in the flowway-closing position, a stem for reciprocating the gate member, means securing the stem to the gate member arranged to permit limited lateral movement between the stem and the gate member, seal means disposed between the stem and the gate member to maintain a seal therebetween, and sealant supply passage means extending through the stem and said seal means into communication with said reservoirs above said barriers.

7. In a rising stem gate valve employing automatic plastic sealing, a housing having a gate chamber therein, a bonnet closing said gate chamber, a flowway intersecting the gate chamber and provided with opposed gate seats, said seats having annular sealing grooves in the inner end faces thereof surrounding said flowway, a gate member reciprocable in said gate chamber across said flowway in slideable engagement with said seats, said gate member comprising a one-piece, generally rectangular, flat-sided body having a through-conduit opening in the lower end thereof, a first longitudinally extending sealant reservoir having a slidable barrier therein enclosed within said body, a port in the gate member providing communication between the gate chamber and the reservoir below said barrier, a passage in the gate member communicating the reservoir above the barrier with one of the side faces of the gate member at a point located to register with the sealing groove in the contiguous gate seat when the gate member is in the flowway-closing position, a second sealant reservoir having a slidable barrier therein enclosed within said body and having communication below the barrier with the exterior of the gate member, a passageway in the gate member providing communication between said first and second reservoirs above the respective barriers, a stem for reciprocating the gate member, means securing the stem to the gate member arranged to permit limited lateral movement between the stem and the gate member, seal means disposed between the stem and the gate member to maintain a seal therebetween, and sealant supply passage means extending through the stem and said seal means into communication with said second reservoir above said barrier therein.

8. In a rising stem gate valve employing automatic plastic sealing, a housing having a gate chamber therein, a bonnet closing said gate chamber, a flowway intersecting the gate chamber and provided with opposed gate seats, said seats having annular sealing grooves in the inner end faces thereof surrounding said flowway, a gate member reciprocable in said gate chamber across said flowway in slidable engagement with said seats, said gate member comprising a one-piece, generally rectangular, flat-sided body having a through-conduit opening in the lower end thereof, a pair of spaced apart, longitudinally extending sealant reservoirs enclosed within said body, barriers slidably disposed in the reservoirs, ports in the gate member providing communication between the gate chamber and the reservoirs below said barriers, passages in the gate member communicating the reservoirs above the barriers with the opposite faces of the gate member at points located to register with the sealing grooves in the respective contiguous gate seats when the gate member is in the flowway-closing position, a third sealant reservoir having a slidable barrier therein enclosed in the body of the gate member and having communication below the barrier with said chamber, passage means in the gate member communicating said third reservoir with each of said pair of reservoirs above the respective barriers, check valve means in both said passage means opening outwardly from said third reservoir, a stem for reciprocating the gate member, means securing the stem to the gate member arranged to permit limited lateral movement between the stem and the gate member, seal means disposed between the stem and the gate member to maintain a seal therebetween, and sealant supply passage means extending through the stem and said seal means into communication with said third reservoir above said barrier therein.

9. In a rising stem gate valve employing automatic plastic sealing, a housing having a gate chamber therein, a bonnet closing said gate chamber, a pair of flow ports in said housing defining a flowway intersecting the gate chamber, opposed annular gate seats removably mounted in the inner ends of said flow ports, said seats having annular sealing grooves in the inner and outer end faces thereof surrounding said flowway, transverse passages through said seats providing communication between said grooves, a gate member reciprocable in said gate chamber across said flowway in slidable engagement with said seats, said gate member comprising a one-piece, generally rectangular flat-sided body having a through-conduit opening in the lower end thereof, a sealant reservoir having a slidable barrier therein enclosed within said body, a port in the gate member providing communication between the gate chamber and the reservoir below said barrier, a passage in the gate member communicating the reservoir above the barrier with the exterior of the gate member at a point located to register with the sealing groove in the inner end face of the contiguous gate seat when the gate member is in the flowway-closing position, a stem for reciprocating the gate member, means securing the stem to the gate member arranged to permit limited lateral movement between the stem and the gate member, seal means comprising a ring member carrying annular packing elements thereon slidably disposed between the stem and the gate member to maintain a seal therebetween, and sealant supply passage means extending through the stem and said seal means into communication with said reservoir above said barrier.

10. In a rising stem gate valve employing automatic plastic sealing, a housing having a gate chamber therein, a bonnet closing said gate chamber, a flowway intersecting the gate chamber and provided with opposed gate seats, said seats having annular sealing grooves in the inner end faces thereof surrounding said flowway, a gate member reciprocable in said gate chamber across said flowway in slidable engagement with said seats, said gate member comprising a one-piece, generally rectangular, flat-sided body having a through-conduit opening in the lower end thereof, a sealant reservoir having a slidable barrier therein enclosed within said body, a port in the gate member providing communication between the gate chamber and the reservoir below said barrier, a passage in the gate member communicating the reservoir above the barrier with the exterior of the gate member at a point located to register with the sealing groove in the contiguous gate seat when the gate member is in the flowway-closing position, a stem extending through said bonnet for reciprocating the gate member, a stuffing box about the stem, means securing the stem to the gate member arranged to permit limited lateral movement between the stem and the gate member, seal means disposed between the stem and the gate member to maintain a seal therebetween, sealant supply passage means extending through the stem and said seal means into communication with said reservoir above said barrier, and port means communicating said sealant supply passage means with said stuffing box.

11. In a rising stem gate valve employing automatic plastic sealing, a gate and stem construction, comprising, a one-piece, generally rectangular flat-sided gate member having a transverse through-conduit opening in the lower end thereof, a sealant reservoir enclosed in the body of the gate member, a barrier slidably disposed in the reservoir, a port providing communication between the exterior of the gate member and the reservoir below the barrier, a passage communicating with the reservoir above the barrier and opening to one of the side faces of the gate member, a stem for reciprocating the gate member, means securing the stem to the gate member arranged to permit limited relative lateral movement between the stem and the gate member, seal means comprising a ring member carrying annular packing elements thereon slidably disposed between the stem and the gate adapted to maintain a seal therebetween, sealant supply passage means extending through the stem and said seal means into communication with said reservoir above said barrier, and gate guide means slidably enclosing the gate member operable to close off the outer end of said passage when the gate member is moved upwardly relative to said guide member.

12. In a rising stem gate valve employing automatic plastic sealing, a gate and stem construction, comprising, a one-piece, generally rectangular, flat-sided gate member having a transverse through-conduit opening in the lower end thereof, a first sealant reservoir enclosed in the body of the gate member, a barrier slidably disposed in the reservoir, a port providing communication between the exterior of the gate member and the reservoir below the barrier, a passage communicating with the reservoir above the barrier and opening to one of the side faces of the gate member, a second sealant reservoir having a slidable barrier therein enclosed in the body of the gate member and having communication below the barrier with the exterior of said gate member, a passageway in the gate member providing communication between said first and second reservoirs above the respective barriers, a stem for reciprocating the gate member, means securing the stem to the gate member arranged to permit limited relative lateral movement between the stem and the gate member, seal means disposed between the stem and the gate member adapted to maintain a seal therebetween, sealant supply passage means extending through the stem and said seal means into communication with said second reservoir above said barrier, and gate guide means slidably enclosing the gate member operable to close off the outer end of said passage when the gate member is moved upwardly relative to said guide member.

13. In a rising stem gate valve employing automatic plastic sealing, a gate and stem construction, comprising, a one-piece, generally rectangular flat-sided gate member having a transverse through-conduit opening in the lower end thereof, a sealant reservoir enclosed in the body of the gate member, a barrier slidably disposed in the reservoir, a port providing communication between the exterior of the gate member and the reservoir below the barrier, a passage communicating with the reservoir above the barrier and opening to one of the side faces of the gate member, a stem for reciprocating the gate member, means securing the stem to the gate member arranged to permit limited relative lateral movement between the stem and the gate member, seal means disposed between the stem and the gate adapted to maintain a seal therebetween, sealant supply passage means extending through the stem and said seal means into communication with said reservoir above said barrier, and a guide for said gate member, said guide comprising a pair of spaced-apart side plates disposed in close sliding engagement with the opposite side faces of the gate member, an arbor connecting the upper ends of said side plates and having an opening for passage of said stem, the longitudinal side edges of said plates being turned toward each other to guidingly enclose the corners of said gate member, said side plates having recesses therein extending about said through-conduit opening and operable to close off the outer end of said passage when the gate member is moved upwardly relative to said guide.

14. In a rising stem gate valve employing automatic plastic sealing, a housing having a gate chamber therein, a bonnet closing said gate chamber, a flowway intersecting the gate chamber and provided with opposed gate seats, said seats having annular sealing grooves in the inner end faces thereof surrounding said flowway, a gate member reciprocable in said gate chamber across said flowway in slidable engagement with said seats, said gate member comprising a one-piece, generally rectangular, flat-sided body having a through-conduit opening in the lower end thereof, a pair of spaced apart, longitudinally extending sealant reservoirs enclosed within said body, barriers slidably disposed in the reservoirs, ports in the gate member providing communication between the gate chamber and the reservoirs below said barriers, passages in the gate member communicating the reservoirs above the barriers with the opposite faces of the gate member at points located to register with the sealing grooves in the respective contiguous gate seats when the gate member is in the flow-way closing position, a third sealant reservoir having a slidable barrier therein enclosed in the body of the gate member and having communication below the barrier with said chamber, passage means in the gate member communicating said third reservoir with each of said pair of reservoirs above the respective barriers, and check valve means in both said passage means opening outwardly from said third reservoir.

15. In a rising stem gate valve employing automatic plastic sealing, a housing having a gate chamber therein, a bonnet closing said gate chamber, a flowway intersecting the gate chamber and provided with opposed gate seats, said seats having annular sealing grooves in the inner end faces thereof surrounding said flowway, a gate member reciprocable in said gate chamber across said flowway in slidable engagement with said seats, said gate member comprising a one-piece, generally rectangular, flat-sided body, a pair of spaced apart, longitudinally extending sealant reservoirs enclosed within said body, barriers slidably disposed in the reservoirs, ports in the gate member providing communication between the gate chamber and the reservoirs below said barriers, passages in the gate member communicating the reservoirs above the barriers with the opposite faces of the gate member at points located to register with the sealing grooves in the respective contiguous gate seats when the gate member is in the flowway closing position, a third sealant reservoir having a slidable barrier therein enclosed in the body of the gate member and having communication below the barrier with said chamber, passage means in the gate member communicating said third reservoir with each of said pair of reservoirs above the respective barriers, and check valve means in both said passage means opening outwardly from said third reservoir.

References Cited by the Examiner

UNITED STATES PATENTS

| | | | |
|---|---|---|---|
| 2,705,019 | 3/55 | Volpin | 251—327 XR |
| 2,872,937 | 2/59 | Honsworth | 137—246.12 XR |
| 2,904,059 | 9/59 | Wynn | 137—246.12 |
| 3,033,224 | 5/62 | Jones | 137—246.12 |
| 3,123,090 | 3/64 | Bredtschneider | 251—327 XR |

FOREIGN PATENTS

| | | |
|---|---|---|
| 613,021 | 5/35 | Germany. |

ISADOR WEIL, *Primary Examiner.*